US008045592B2

(12) United States Patent
Combi et al.

(10) Patent No.: US 8,045,592 B2
(45) Date of Patent: Oct. 25, 2011

(54) MULTIPLE ANTENNA MULTIPLEXERS, DEMULTIPLEXERS AND ANTENNA ASSEMBLIES

(75) Inventors: Joseph Michael Combi, Grand Blanc, MI (US); Ayman Duzdar, Holly, MI (US); Gary Keith Reed, Grand Blanc, MI (US)

(73) Assignee: Laird Technologies, Inc., Chesterfield, MO (US)

( * ) Notice: Subject to any disclaimer, the term of this patent is extended or adjusted under 35 U.S.C. 154(b) by 222 days.

(21) Appl. No.: 12/397,679

(22) Filed: Mar. 4, 2009

(65) Prior Publication Data

US 2010/0226354 A1 Sep. 9, 2010

(51) Int. Cl.
*H04J 1/00* (2006.01)

(52) U.S. Cl. ......... 370/537; 370/542; 370/315; 370/328

(58) Field of Classification Search ........................ None
See application file for complete search history.

(56) References Cited

U.S. PATENT DOCUMENTS 6,097,974 A 8/2000 Camp, Jr. et al.
6,249,245 B1 6/2001 Watters et al.
6,298,243 B1 * 10/2001 Basile ........................ 455/552.1
6,346,919 B1 * 2/2002 Wang et al. ................... 343/767
6,917,340 B2 7/2005 Lindenmeier
6,928,276 B2 8/2005 Kushihi
6,937,197 B2 * 8/2005 Wiedmann et al. ........... 343/713
6,996,384 B2 * 2/2006 Yamawaki et al. ......... 455/180.1
7,019,705 B2 * 3/2006 Pfletschinger et al. ....... 343/770
7,277,056 B1 10/2007 Thiam et al.
7,295,167 B2 11/2007 Aminzadeh et al.
7,359,712 B2 4/2008 Gutowski et al.
7,489,280 B2 2/2009 Aminzadeh et al.
7,511,675 B2 * 3/2009 Puente-Baliarda et al. .. 343/713
7,683,840 B2 * 3/2010 Lin et al. ........................ 343/702
7,696,927 B2 * 4/2010 Bae et al. ............... 343/700 MS
7,917,103 B2 * 3/2011 Feher ............................ 455/102
2004/0056812 A1 3/2004 Sabet et al.
2004/0119644 A1 6/2004 Puente-Baliarda et al.
2004/0176102 A1 9/2004 Lawrence et al.
2005/0118977 A1 6/2005 Drogi et al.

(Continued)

FOREIGN PATENT DOCUMENTS

BR MU8500634 U 11/2006

(Continued)

OTHER PUBLICATIONS

Business Wire: PCTEL Antenna Products Group Announces New Combination GPS and Digital Cellular Antenna for Mobile Transit Applications; AST8001900GPS Covers Mobile AMPS, GSM, UMTS, CDMA 2000, TDMA, PDC and GPS, Feb. 13, 2006, 2 pages.

(Continued)

*Primary Examiner* — Robert Scheibel
(74) *Attorney, Agent, or Firm* — Harness, Dickey & Pierce, P.L.C.

(57) ABSTRACT

Exemplary embodiments are provided of apparatus and methods relating to antenna multiplexers and demultiplexers are disclosed. In exemplary embodiments, antenna multiplexers include two or more inputs for receiving a corresponding number of signals from multiple antennas. The antennas may include world cell antennas, AM/FM antennas, SDARS antennas, GPS antennas, and/or antennas combining the preceding. Exemplary antenna multiplexers also include an output for simultaneously outputting the combined signals received by the multiplexer. Demultiplexers for receiving such combined signals and outputting each signal via a separate output are also disclosed.

17 Claims, 10 Drawing Sheets

U.S. PATENT DOCUMENTS

| | | | |
|---|---|---|---|
| 2005/0119025 | A1 | 6/2005 | Mohindra et al. |
| 2005/0242990 | A1 | 11/2005 | Lawrence et al. |
| 2006/0020975 | A1 | 1/2006 | Kenny |
| 2006/0030356 | A1 | 2/2006 | Haub et al. |
| 2006/0128347 | A1 | 6/2006 | Piriyapoksombut et al. |
| 2006/0227905 | A1 | 10/2006 | Kunysz et al. |
| 2006/0273969 | A1 | 12/2006 | Aminzadeh et al. |
| 2007/0182626 | A1 * | 8/2007 | Samavati et al. ......... 342/357.06 |
| 2007/0210967 | A1 | 9/2007 | Aminzadeh et al. |
| 2008/0012777 | A1 | 1/2008 | Lin et al. |
| 2008/0068270 | A1 | 3/2008 | Thiam et al. |
| 2008/0090514 | A1 * | 4/2008 | Yegin et al. .................. 455/3.02 |
| 2008/0111752 | A1 | 5/2008 | Lindackers et al. |
| 2008/0146176 | A1 | 6/2008 | Duzdar et al. |
| 2008/0198077 | A1 | 8/2008 | Duzdar et al. |

FOREIGN PATENT DOCUMENTS

| | | |
|---|---|---|
| JP | 2002-125206 | 4/2002 |
| WO | WO 96/08878 | 3/1996 |
| WO | WO 2010/101675 | 9/2010 |

OTHER PUBLICATIONS

Multi Band Cellular-GPS Combination, Undated Document (referencing U.S. Patent 6,346,919), 2 pages.

Written Opinion and International Search Report dated Oct. 4, 2010, issued by the International Search Authority for International Patent Application No. PCT/US2010/021736, 14 pages.

* cited by examiner

MULTIPLE ANTENNA MULTIPLEXERS, DEMULTIPLEXERS AND ANTENNA ASSEMBLIES

FIELD

The present disclosure relates to multiplexers and assemblies for receiving signals from multiple antennas and combining the received signals for transmission on a single output, and to demultiplexers for receiving multiple signals on a single input and outputting the signals on separate outputs.

BACKGROUND

This section provides background information related to the present disclosure which is not necessarily prior art.

There are numerous, varied wireless communication standards, such as Wi-Fi, GPS, PCS/GSM1900, UMTS/AWS, AMPS/GSM850, AM/FM radio, etc., in existence today, many of which operate within different frequency bands. Often, a separate antenna is used to receive each type of signal. Some antennas are operable to receive signals from two or more frequency bands. Each antenna typically is attached to a separate cable, such as a coaxial cable, for coupling a signal received by the antenna to the location at which the signal will be used, such as a radio receiver, GPS navigation device, cellular phone, etc.

SUMMARY

This section provides a general summary of the disclosure, and is not a comprehensive disclosure of its full scope or all of its features.

According to various aspects, exemplary embodiments are provided of apparatus and methods relating to antenna multiplexers and demultiplexers. In an exemplary embodiment, an antenna multiplexer includes a first input for receiving a communication signal from a world cell antenna operable to receive AMPS/GSM850, GSM900, GSM1800, PCS/GSM1900, and UMTS/AWS communication signals. The multiplexer further includes a second input for receiving a satellite signal from a satellite antenna and an output for outputting a combined signal including the communication signal and the satellite signal.

Another exemplary embodiment includes an antenna multiplexer including a first input for receiving a radio signal from an AM/FM antenna. The multiplexer also includes a second input for receiving a satellite digital audio radio service (SDARS) signal from a SDARS antenna and an output for simultaneously outputting signals received by the antenna multiplexer.

Other exemplary embodiments include an antenna multiplexer having a first input for receiving a radio signal from an AM/FM antenna and a second input for receiving a communication signal from a world cell antenna operable to receive AMPS/GSM850, GSM900, GSM1800, PCS/GSM1900, and UMTS/AWS communication signals. The multiplexer includes a third input for receiving a satellite signal from a satellite antenna and an output for simultaneously outputting signals received by the antenna multiplexer.

In yet another exemplary embodiment, an antenna demultiplexer includes an input capable of simultaneously receiving radio signal from an AM/FM antenna, a communication signal from a world cell antenna operable to receive AMPS/GSM850, GSM900, GSM1800, PCS/GSM1900, and UMTS/AWS communication signals and a satellite signal from a satellite antenna. The demultiplexer further includes a first output for outputting the radio signal, a second output for outputting the communication signal, and a third output for outputting the satellite signal.

According to still another example embodiment, an antenna demultiplexer includes an input capable of simultaneously receiving radio signal from an AM/FM antenna, and a satellite digital audio radio service (SDARS) signal from a SDARS antenna. The demultiplexer includes a first output for outputting the radio signal, and a second output for outputting the SDARS signal.

In another example embodiment, an antenna demultiplexer includes an input capable of simultaneously receiving a communication signal from a world cell antenna operable to receive AMPS/GSM850, GSM900, GSM1800, PCS/GSM1900, and UMTS/AWS communication signals, and a satellite signal from a satellite antenna. The demultiplexer includes a first output for outputting the communication signal and a second output for outputting the satellite signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure in any way.

Corresponding reference numerals indicate corresponding parts throughout the several views of the drawings.

DETAILED DESCRIPTION

In the following description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill.

According to various aspects of the present disclosure, antenna combiners, also known as multiplexers, for combining signals from a plurality of antennas are disclosed. The multiplexers combine the multiple input signals received by the multiplexer and output the combined signals on a single output. Thus, multiple antennas for receiving various signals (e.g., signals having different frequencies, types, etc.) can be connected to a multiplexer such that a single communication line or link (e.g., a coaxial cable, other communication line, etc.) may be used to carry the multiple signals simultaneously from the multiplexer to a location at which it is desired that the multiple signals be received. The location for receiving the signals may be, for example, the location of an AM/FM radio receiver, a cellular phone, a global positioning satellite (GPS) receiver, a satellite digital audio radio service (SDARS) receiver, a receiver comprising some or all of the preceding, etc.

At least some multiplexers according to the present disclosure may be used in connection with an automobile. Some automobile manufacturers have begun integrating various combinations of radio, GPS, SDARS, cell phone, etc. into their vehicles. Each of the various antennas used for such services are typically connected to a different cable, or wire, which is routed to a receiver located around a dashboard of the vehicle. By employing at least some aspects of the present disclosure, the number of cables from the antennas to the console may be reduced. A multiplexer according to the present disclosure may be installed in a vehicle at a location near the various antennas. A plurality of the antennas may be connected to the multiplexer, and a single communication line or link (e.g., coaxial cable, other suitable communication line, etc.) may be routed from the multiplexer output to the console of the vehicle to carry the signals received from the plurality of antennas connected to the multiplexer.

Figure 1:
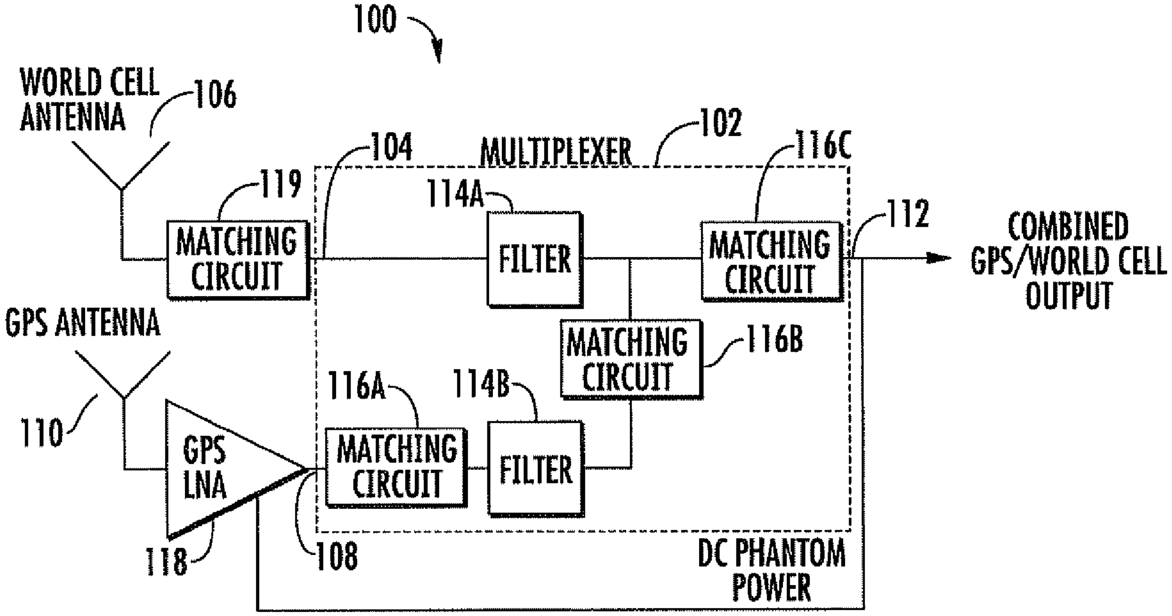
FIG. 1 is a block diagram of an exemplary embodiment of an antenna system including a GPS antenna, a world cell antenna, and a multiplexer for combining signals from the antennas in the system according to aspects of the present disclosure.

Turning now to FIG. 1, there is shown an example embodiment of an antenna system 100 including an antenna multiplexer 102 according to at least one aspect of the present disclosure. The multiplexer 102 includes a first input 104 for receiving a communication signal from a world cell antenna 106. In various embodiments, a communication signal may also be transmitted from the multiplexer 102 to the word cell antenna 106 via the input 104, in which case the input 104 may also be referred to as an input/output. Other embodiments may include an output separate from, and not combined with, the input 104.

The world cell antenna 106, in this and other exemplary embodiments of this disclosure, is operable to receive AMPS/GSM850, GSM900, GSM1800, PCS/GSM1900, and UMTS/AWS communication signals. The world cell antenna 106 may also be operable for receiving other signals, such as GSM850, GSM1900, AWS, etc. The frequencies of such signals typically fall within the 824-960 MHz bandwidth and the 1710-2170 MHz bandwidth. The multiplexer 102 further includes a second input 108 for receiving a satellite signal from a satellite antenna 110.

The multiplexer 102 also includes an output 112 for outputting a combined signal that includes the communication signal and the satellite signal. In various embodiments, a single communication link or line (e.g., a single coaxial cable, etc.) may be routed from the multiplexer output 112, for example, to a console of a vehicle to carry the combined communication/satellite signal. By way of example, the power (e.g., DC power) for operating the multiplexer 102 may be provided by a GPS receiver via the same coaxial cable that is routed from the multiplexer output 112 and carries the combined communication/satellite signal. This is generally referred to as "DC PHANTOM POWER" in FIG. 1. In such example, the GPS receiver knows that the GPS antenna 110 is in communication with the GPS receiver by sensing the current drawn by the GPS LNA 118. Alternatively, the phantom power could be provided by other means besides the GPS receiver, such as the AM/FM radio receiver, the car's electrical system directly, etc. The power may also be used for operating amplifiers (LNA) and/or antennas (e.g., antennas having amplifiers built in, etc.). In some embodiments, a voltage regulator may be used to provide a different voltage for components that need a different (typically lower) voltage than the (e.g., approximately 12 volts, etc.) phantom DC voltage.

According to at least one exemplary embodiment, the multiplexer 102 includes a plurality of filters 114A, 114B, sometimes collectively referred to herein as filters 114. The filters 114 allow certain frequency signals to pass through the filter, while preventing other frequencies from passing. Although each of the filters 114 is illustrated as a single block, the filters 114 may be a single filter or a plurality of filters. The filters 114 may be any suitable filter, such as a high pass filter, low pass filter, bandpass filter, notch filter, etc., or any combination thereof. In the example embodiment of FIG. 1, the filter 114A permits the communications signals from and to the world cell antenna 106 to pass the filter 114A, but prevents the satellite signals from the satellite antenna 110 from passing the filter 114A. To the satellite signals, the filter 114A may appear as an open circuit. Thus, satellite signals are prevented from passing to the world cell antenna 106 and being radiated out and received by the satellite antenna 110 (which may create an unstable feedback loop). Conversely, the filter 114B permits the satellite signals from the satellite antenna 110 to pass the filter 114B, but prevents the communications signals from and to the world cell antenna 106 from passing the filter 114B. To the communications signals, the filter 114B may appear as an open circuit. Thus, communication signals are prevented from passing to the satellite antenna 110 and being radiated out and received by the world cell antenna 106 (which may create an unstable feedback loop).

The multiplexer 102 may also include a plurality of matching circuits 116A, 116B, 116C (collectively matching circuits 116). The matching circuits 116 mitigate signal degradation. The matching circuits 116 are typically used to match impedances in order to reduce signal reflections, standing waves, etc. More particularly, the matching circuit 116A, for example, matches the impedance of the satellite antenna 110, which may include a low noise amplifier (LNA) 118, with the filter 114B. The matching circuit 116B compensates for impedance changes brought about by the filter 114B to reduce signal degradation when the output of filter 114B is combined with the output of filter 114A. Finally, matching circuit 116C may be used to alter the output impedance of the multiplexer 102. A fourth matching circuit 119 is part of, or coupled to, the world cell antenna 106 and is not illustrated as part of the multiplexer 102. But in some embodiments, particularly those for use with world cell antennas without an integrated matching circuit 119, the matching circuit 119 may be part of the multiplexer 102.

Figure 2:
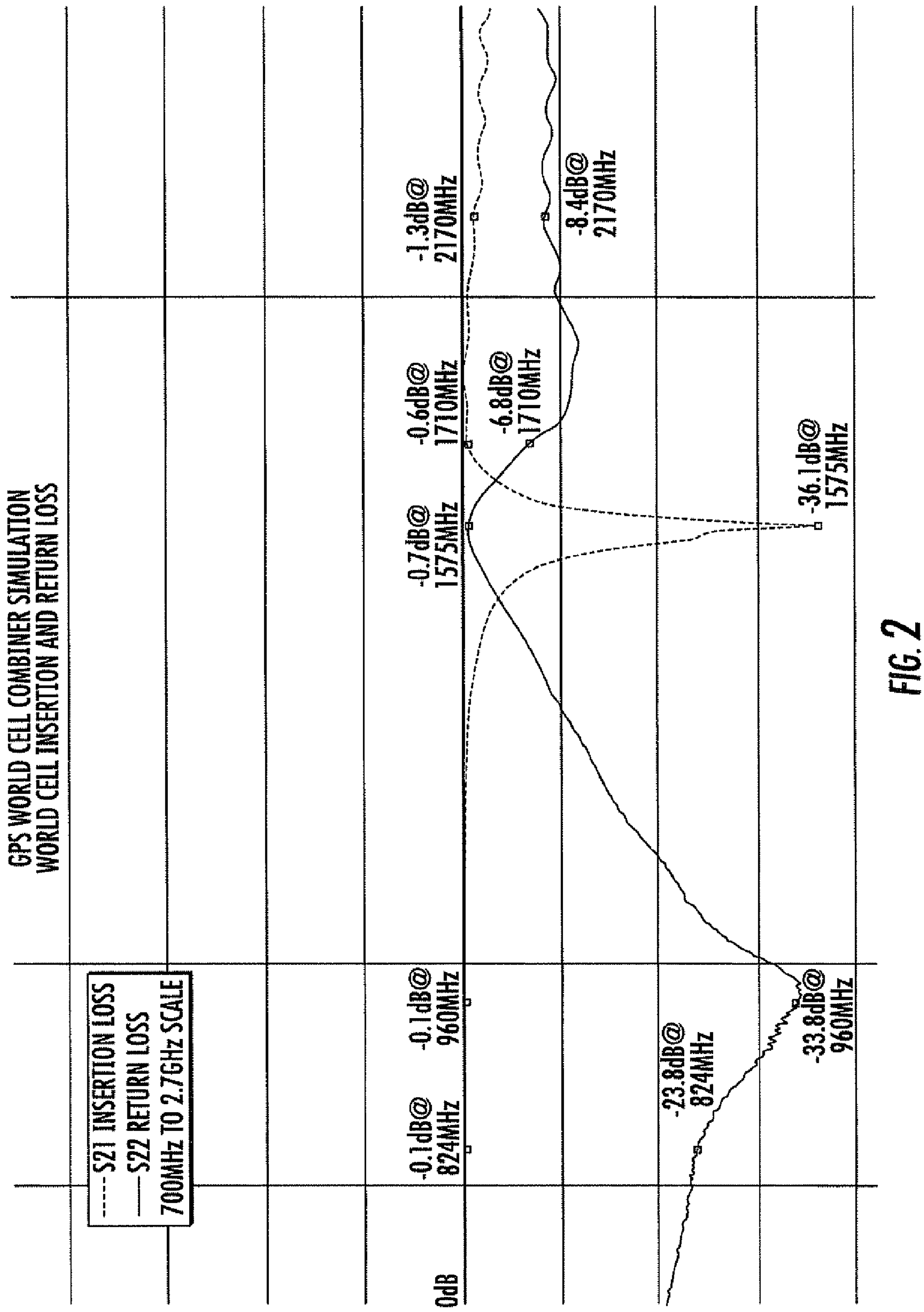
FIG. 2 is a graph of S21 and S22 simulation results for the world cell portion of the multiplexer in FIG. 1.
Figure 3:
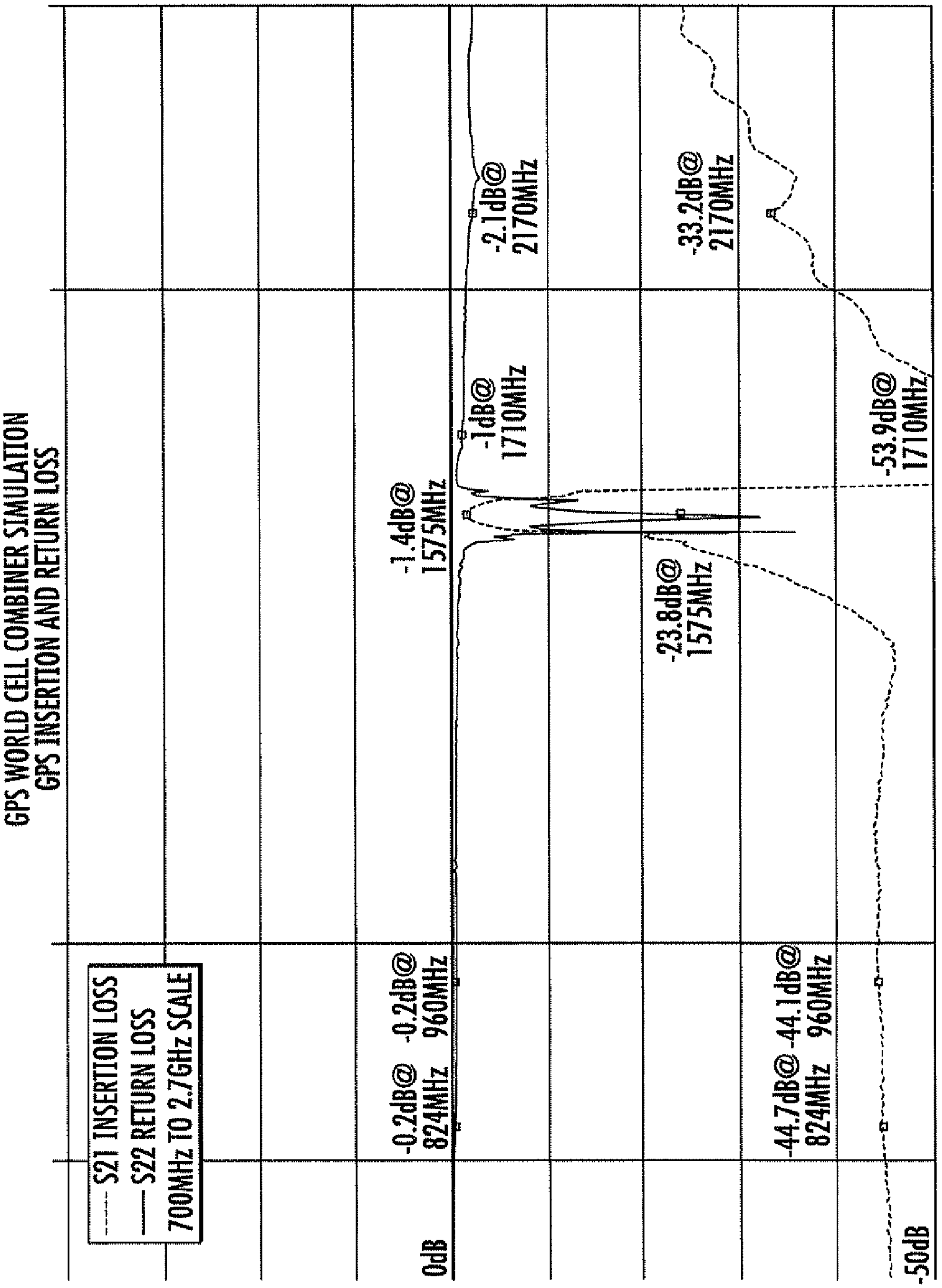
FIG. 3 is a graph of S21 and S22 simulation results for the GPS portion of the multiplexer in FIG. 1.
Figure 4:
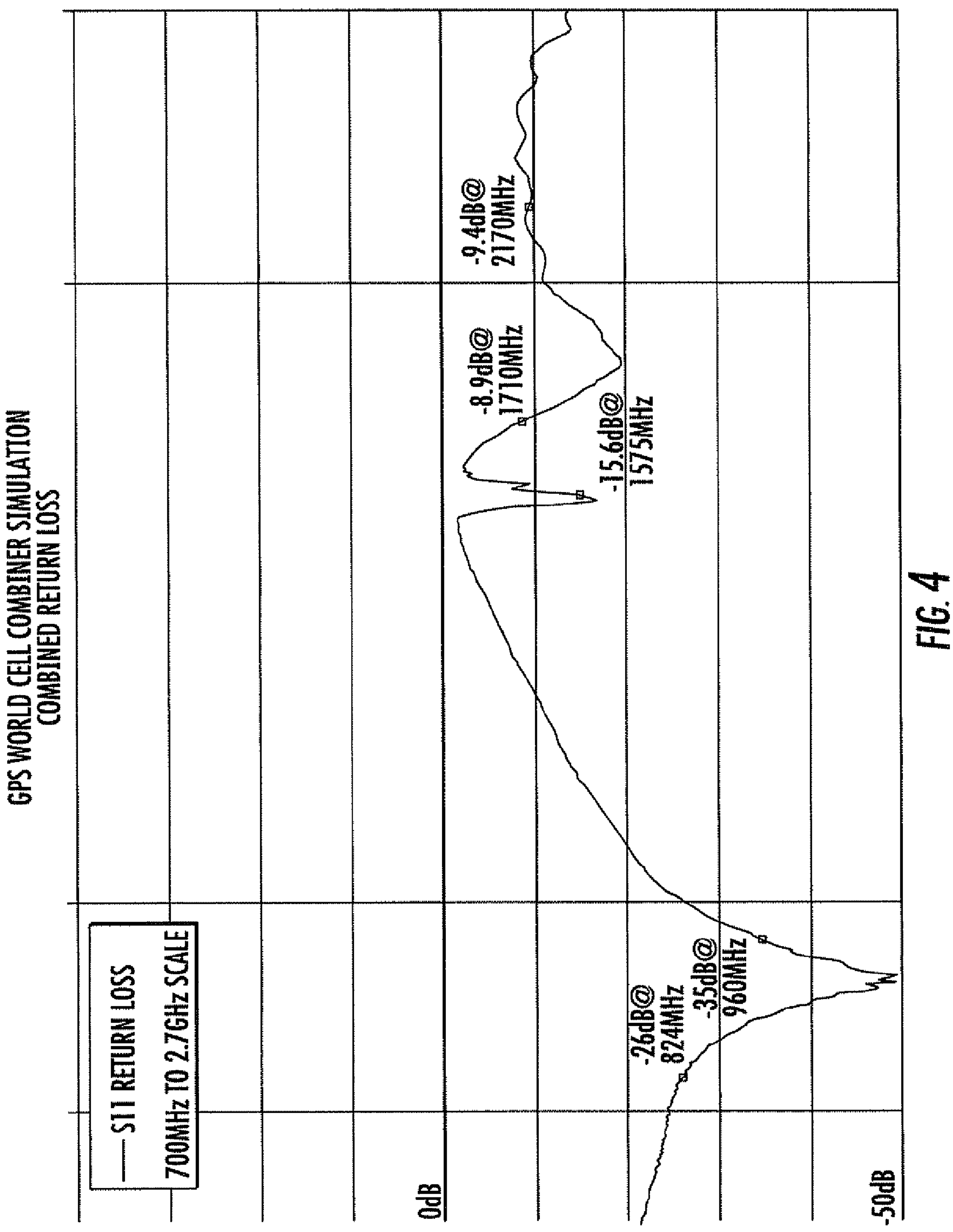
FIG. 4 is a graph of overall S11 simulation results for the multiplexer in FIG. 1.

S21 insertion loss and S22 return loss simulation results for the multiplexer 102 of FIG. 1 are graphically illustrated in FIGS. 2 and 3. The simulation results for the world cell antenna 106 branch of the multiplexer 102 are illustrated in FIG. 2. As can be seen in FIG. 2, this branch of the multiplexer passes signals having a frequency of about 824-960 MHz and 1710-2170 MHz, while rejecting signals having a frequency around 1575 MHz. Thus, this branch will permit communications signals from the world cell antenna 106 to pass and block signals from the satellite antenna (which in this embodiment is a GPS antenna for receiving GPS signals of about 1575 MHZ). Conversely, as can be seen in FIG. 3, the satellite antenna 110 branch of the multiplexer passes signals having a frequency around 1575 MHz and blocks signals having a frequency of about 824-960 MHz and 1710-2170 MHz. The overall S11 return loss of the multiplexer 102 is graphed in FIG. 4.

Figure 5:
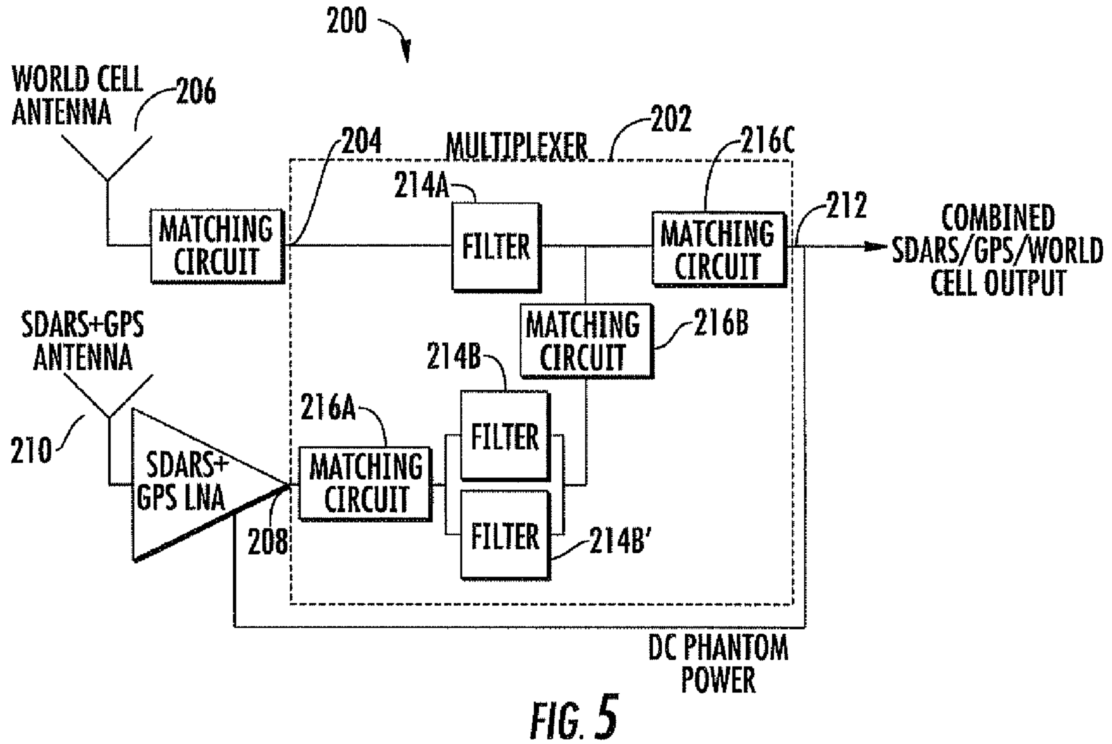
FIG. 5 is a block diagram of an exemplary embodiment of an antenna system including a GPS and SDARS antenna, a world cell antenna, and a multiplexer for combining signals from the antennas in the system according to aspects of the present disclosure.

FIG. 5 illustrates another embodiment of an antenna system 200 that includes another multiplexer 202 according to at least one aspect of the present disclosure. As shown in FIG. 5, the multiplexer 202 includes a first input 204 for receiving a communication signal from a world cell antenna 206. In various embodiments, a communication signal may also be transmitted from the multiplexer 202 to the word cell antenna 206 via the input 204, in which case the input 204 may also be referred to as an input/output. Other embodiments may include an output separate from, and not combined with, the input 204.

The multiplexer 202 further includes a second input 208 for receiving a satellite signal from a satellite antenna 210. The multiplexer 202 also includes an output 212 for outputting a combined signal including the communication signal and the satellite signal. The satellite antenna 210 is a combined GPS and satellite digital audio radio service (SDARS) antenna. In various embodiments, a single communication link or line (e.g., a single coaxial cable, etc.) may be routed from the multiplexer output 212, for example, to a console of a vehicle to carry the combined communication/GPS/SDARS signal. By way of example, the power (e.g., DC power) for operating the multiplexer 202 may be provided by a GPS receiver and/or SDARS receiver via the same coaxial cable that is routed from the multiplexer output 212 and carries the combined communication/GPS/SDARS signal. This is generally referred to as "DC PHANTOM POWER" in FIG. 5. In such example, the GPS and/or SDARS receiver knows that the antenna 210 is in communication with the GPS and/or SDARS receiver by sensing the current drawn by the SDARS+GPS LNA. Alternatively, the phantom power could be provided by other means besides GPS receiver and SDARS receiver, such as the AM/FM radio receiver, the car's electrical system directly, etc. The power may also be used for operating amplifiers (LNA) and/or antennas (e.g., antennas having amplifiers built in, etc.). In some embodiments, a voltage regulator may be used to provide a different voltage for components that need a different (typically lower) voltage than the (e.g., approximately 12 volts, etc.) phantom DC voltage.

The multiplexer 202 is similar to the multiplexer 102 in FIG. 1. and operates similarly. The multiplexer includes a plurality of matching circuits 216A, 216B, 216C and filters, 214A, 214B, 214B'. Filters 214B and 214B' may be a single filter, a combination of filters, separate single filters, separate combinations of filters, etc. Because the satellite antenna 210 is a combined GPS and SDARS antenna, however, the satellite signals received at the second input 208, may including GPS signals and/or SDARS signals. Accordingly, filter 214B may be configured to permit GPS signals to pass, while blocking passage of other signals. Similarly, the filter 214B' may be configured to permit SDARS signals (e.g., signals having a frequency about 2300 MHz) to pass, while limiting or preventing passage of signals having other frequencies.

Figure 6:
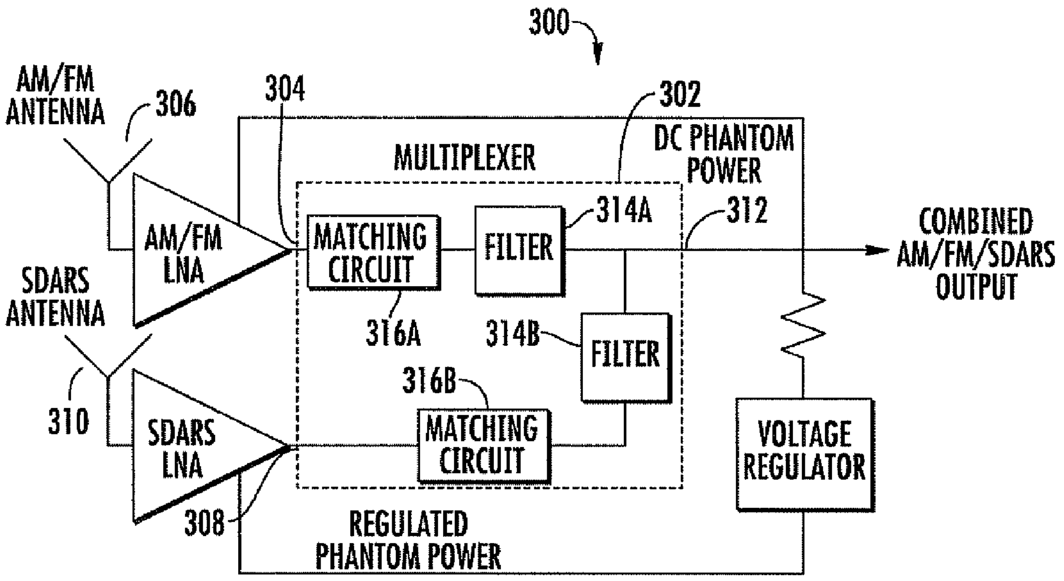
FIG. 6 is block diagram of an exemplary embodiment of an antenna system including an SDARS antenna, an AM/FM antenna, and a multiplexer for combining signals from the antennas in the system according to aspects of the present disclosure.

FIG. 6 illustrates another embodiment of an antenna system 300 that includes another example multiplexer 302 according to at least one aspect of the present disclosure. As shown in FIG. 6, the multiplexer 302 includes a first input 304 for receiving a radio signal from an AM/FM antenna 306. The multiplexer 302 includes a second input 308 for receiving a SDARS signal from a SDARS antenna 310.

The multiplexer 302 also includes an output 312 for simultaneously outputting signals received by the antenna multiplexer 302. In various embodiments, a single communication link or line (e.g., a single coaxial cable, etc.) may be routed from the multiplexer output 312, for example, to a console of a vehicle to carry the combined AM/FM/SDARS signal. By way of example, the power (e.g., DC power) for operating the multiplexer 302 may be provided by an AM/FM receiver ("DC PHANTOM POWER") and/or SDARS receiver ("REGULATED PHANTOM POWER") via the same coaxial cable that is routed from the multiplexer output 312 and carries the combined AM/FM/SDARS signal. In addition, a voltage regulator may also be provided as shown in FIG. 6 to provide a different voltage for components that need a different (typically lower) voltage than the (e.g., approximately 12 volts, etc.) phantom DC voltage. In this example, the AM/FM receiver knows that the AM/FM antenna 306 is in communication with the AM/FM receiver by sensing the current drawn by the AM/FM LNA. Similarly, the SDARS receiver knows that the SDARS antenna 310 is in communication with the SDARS receiver by sensing the current drawn by the SDARS LNA. Alternatively, the phantom power could be provided by other means besides the AM/FM receiver and SDARS receiver, such as the car's electrical system directly, etc. The power may also be used for operating amplifiers (LNA) and/or antennas (e.g., antennas having amplifiers built in, etc.).

According to at least one exemplary embodiment, the multiplexer 302 includes a plurality of filters 314A, 314B, sometimes collectively referred to as filters 314. As with filters 114 and 214, each of the filters 314 allows certain frequency signals to pass through the filter 314, while preventing signals having other frequencies from passing. The filter 314A permits the radio signals from the AM/FM antenna 306 to pass the filter 314A, but prevents the SDARS signals from the SDARS antenna 310 from passing the filter 314A. To the SDARS signals, the filter 314A may appear as an open circuit. Thus, SDARS signals are prevented from passing to and radiating from the AM/FM antenna 306 and being received by the SDARS antenna 310 (which may create an unstable feedback loop). Conversely, the filter 314B permits the SDARS signals from the SDARS antenna 310 to pass the filter 314B, but prevents the radio signals from the AM/FM antenna 306 from passing the filter 314B. To the radio signals, the filter 314B may appear as an open circuit. Thus, radio signals are prevented from passing to and being radiated from the SDARS antenna 310 and being received by the AM/FM antenna 306 (which may create an unstable feedback loop).

The multiplexer 302 may also include a plurality of matching circuits 316A, 316B (collectively matching circuits 316). As with matching circuits discussed above, the matching circuits 316 mitigate signal degradation. The matching circuits 316 may be used to match impedances in order to reduce signal reflections, standing waves, etc.

Figure 7:
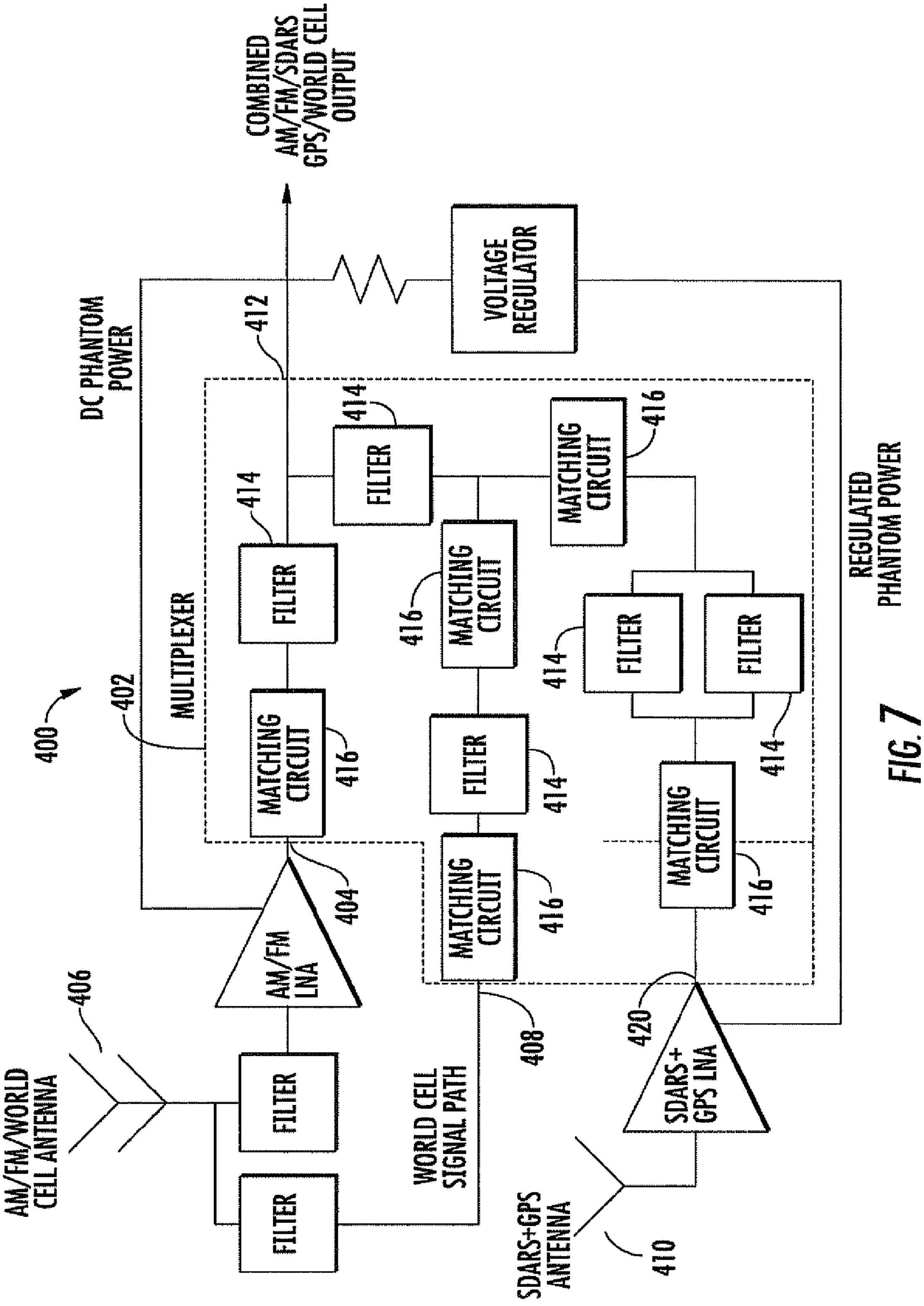
FIG. 7 is a block diagram of an exemplary embodiment of an antenna system including a SDARS/GPS antenna, a world cell/AM/FM antenna, and a multiplexer for combining signals from the antennas in the system according to aspects of the present disclosure.

FIG. 7 illustrates yet another embodiment of an antenna system 400 that includes an antenna multiplexer 402 according to at least one aspect of the present disclosure. As shown in FIG. 7, the multiplexer 402 includes a first input 404 for receiving a radio signal from an AM/FM antenna, which is part of a combined world cell/AM/FM antenna 406. The multiplexer 402 also includes a second input 408 for receiving a communication signal from a world cell antenna 406, which is also part of the combined world cell/AM/FM antenna 406. In various embodiments, a communication signal may also be transmitted from the multiplexer 402 to the word cell antenna via the input 408, in which case the input 408 may also be referred to as an input/output. Other embodiments may include an output separate from, and not combined with, the input 408.

In this example embodiment, the world cell antenna and the AM/FM antenna are provided via the combined world cell/AM/FM antenna 406. But other embodiments may include an AM/FM antenna that is separate from (and not combined with) a world cell antenna. Continuing with a description of the exemplary world cell/AM/FM antenna 406, the world cell antenna of this embodiment is operable to receive AMPS/GSM850, GSM900, GSM1800, PCS/GSM1900, and UMTS/AWS communication signals. The multiplexer 402 includes a third input 420 for receiving a satellite signal from a satellite antenna 410.

The multiplexer 402 includes an output 412 for simultaneously outputting signals received by the antenna multiplexer 402. In various embodiments, a single communication link or line (e.g., a single coaxial cable, etc.) may be routed from the multiplexer output 412, for example, to a console of a vehicle to carry the combined AM/FM/communication/satellite signal. By way of example, the power (e.g., DC power) for operating the multiplexer 402 may be provided by an AM/FM receiver ("DC PHANTOM POWER") and/or SDARS and/or GPS receiver ("REGULATED PHANTOM POWER") via the same coaxial cable that is routed from the multiplexer output 412 and carries the combined AM/FM/communication/satellite signal. In addition, a voltage regulator may also be provided as shown in FIG. 7 to provide a different voltage for components that need a different (typically lower) voltage than the (e.g., approximately 12 volts, etc.) phantom DC voltage. In this example, the AM/FM receiver knows that the AM/FM antenna is in communication with the AM/FM receiver by sensing the current drawn by the AM/FM LNA. Similarly, the GPS and/or SDARS receiver knows that the antenna 410 is in communication with the GPS and/or SDARS receiver by sensing the current drawn by the SDARS+GPS LNA. Alternatively, the phantom power could be provided by other means, such as the car's electrical system directly, etc. The power may also be used for operating amplifiers (LNA) and/or antennas (e.g., antennas having amplifiers built in, etc.).

The multiplexer 402 combines features of the multiplexers 202 (FIG. 5) and 302 (FIG. 6). According to at least one exemplary embodiment, the multiplexer 402 includes a plurality of filters 414. As with filters 114, 214, and 314, each of the filters 414 allows certain frequency signals to pass through the filter, while preventing signals having other frequencies from passing.

The multiplexer 402 may also include a plurality of matching circuits 416. As with matching circuits discussed above, the matching circuits 416 mitigate signal degradation. The matching circuits 416 may be used to match impedances in order to reduce signal reflections, standing waves, etc.

The antenna system 400 shown in FIG. 7 includes a combined SDARS and GPS satellite antenna 410. In the alternative embodiment shown in FIG. 8, the antenna system 500 includes separate SDARS and GPS antennas. A multiplexer 502 incorporates aspects of several, or all, of the multiplexers discussed above.

Figure 8:
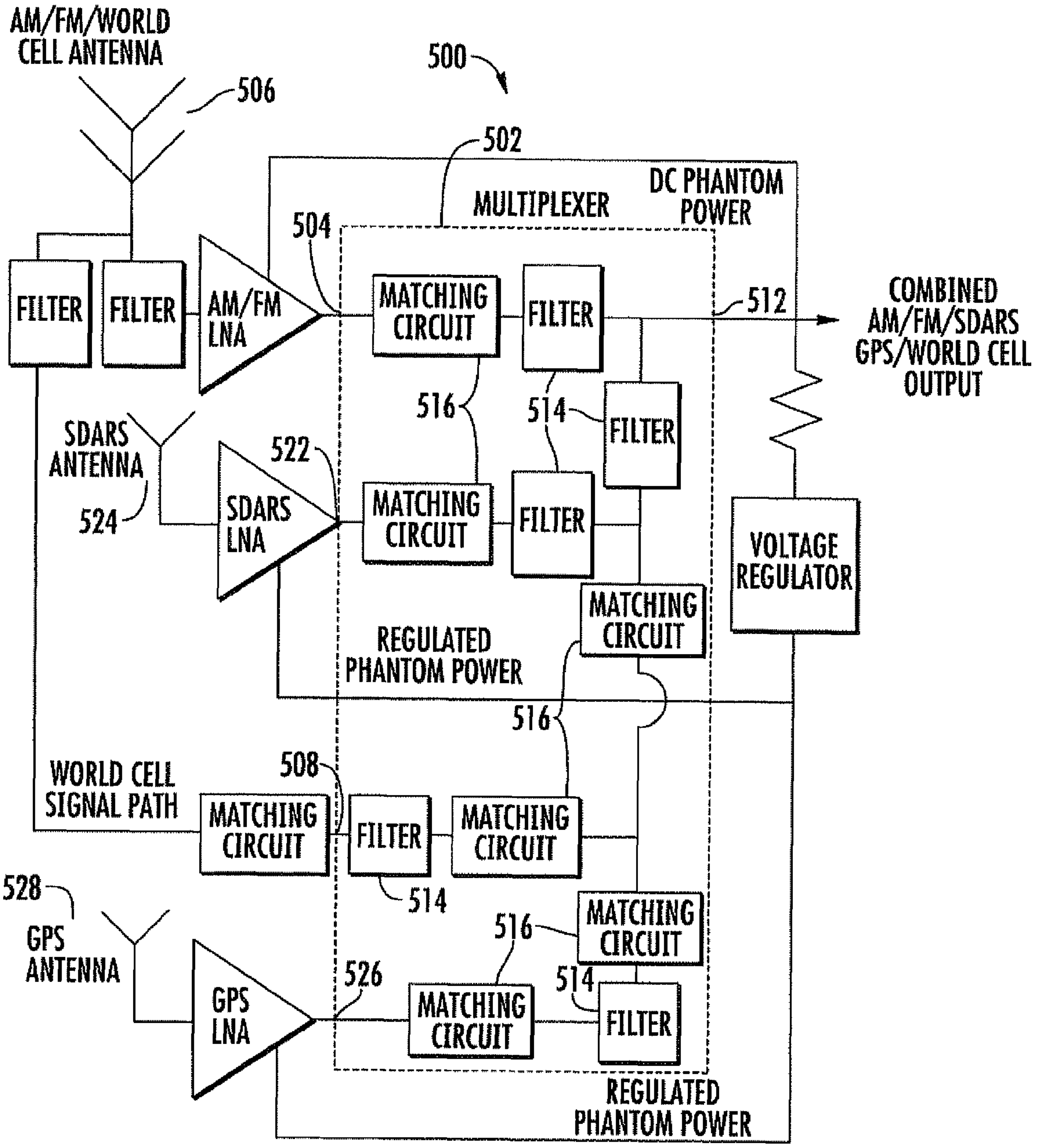
FIG. 8 is a block diagram of an exemplary embodiment of an exemplary embodiment of an antenna system including a SDARS antenna, a GPS antenna, a world cell/AM/FM antenna, and a multiplexer for combining signals from the antennas in the system according to aspects of the present disclosure.

In the particular embodiment illustrated in FIG. 8, the multiplexer 502 includes a first input 504 for receiving a radio signal from an AM/FM antenna (which is part of the combined AM/FM/world cell antenna 506) and a second input 508 for receiving a communication signal from a world cell antenna (which is also part of the combined AM/FM/world cell antenna 506). In various embodiments, a communication signal may also be transmitted from the multiplexer 502 to the word cell antenna via the input 508, in which case the input 508 may also be referred to as an input/output. Other embodiments may include an output separate from, and not combined with, the input 508.

In this example embodiment, the world cell antenna and the AM/FM antenna are provided via the combined world cell/AM/FM antenna 506. But other embodiments may include an AM/FM antenna that is separate from (and not combined with) a world cell antenna. Continuing with a description of the exemplary world cell/AM/FM antenna 506, the world cell antenna of this embodiment is operable to receive AMPS/GSM850, GSM900, GSM1800, PCS/GSM1900, and UMTS/AWS communication signals.

The multiplexer 502 includes a third input 522 for receiving a SDARS signal from a SDARS antenna 524. The multiplexer 502 has a fourth input 526 for receiving a GPS signal from a GPS antenna 528.

The multiplexer 502 includes an output 512 for simultaneously outputting signals received by the antenna multiplexer 502. In various embodiments, a single communication link or line (e.g., a single coaxial cable, etc.) may be routed from the multiplexer output 512, for example, to a console of a vehicle to carry the combined AM/FM/communication/SDARS/GPS signal. By way of example, the power (e.g., DC power) for operating the multiplexer 502 may be provided by an AM/FM receiver ("DC PHANTOM POWER") and/or GPS receiver ("REGULATED PHANTOM POWER") via the same coaxial cable that is routed from the multiplexer output 412 and carries the combined AM/FM/communication/SDARS/GPS signal. In addition, a voltage regulator may also be provided as shown in FIG. 8 to provide a different voltage for components that need a different (typically lower) voltage than that (e.g., approximately 12 volts, etc.) phantom DC voltage. In this example, the AM/FM receiver knows that the AM/FM antenna is in communication with the AM/FM receiver by sensing the current drawn by the AM/FM LNA. Similarly, the SDARS receiver knows that the GPS antenna 528 is in communication with the GPS receiver by sensing the current drawn by the GPS LNA. Alternatively, the phantom power could be provided by other means, such as the car's electrical system directly, etc. The power may also be used for operating amplifiers (LNA) and/or antennas (e.g., antennas having amplifiers built in, etc.).

According to at least one exemplary embodiment, the multiplexer 502 includes a plurality of filters 514. As with filters 114, 214, 314, and 414, each of the filters 514 allows certain frequency signals to pass through the filter 514, while preventing signals having other frequencies from passing.

The multiplexer 502 may also include a plurality of matching circuits 516. As with matching circuits discussed above, the matching circuits 516 mitigate signal degradation. The matching circuits 516 may be used to match impedances in order to reduce signal reflections, standing waves, etc.

Additionally, demultiplexing the combined signals (the signals output by the multiplexers discussed above) may be accomplished by reversing the operations discussed above with reference to the multiplexers. Thus, similar circuits, if not exactly identical, to the multiplexers above may receive the output of a multiplexer as an input and output several separate signals.

Figure 9:
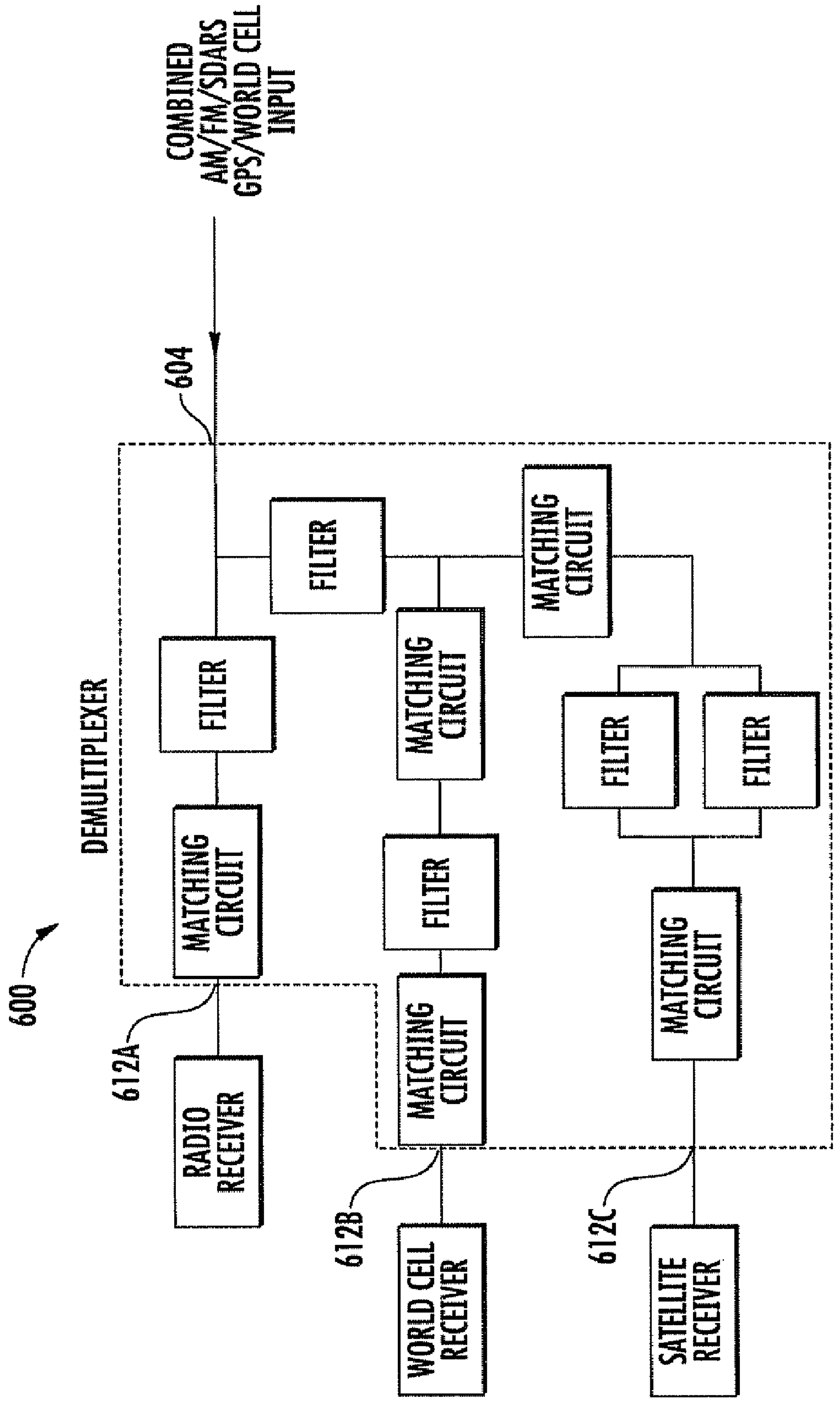
FIG. 9 is a block diagram of an exemplary embodiment of a demultiplexer for demultiplexing combined world cell/AM/FM/satellite signals output by a multiplexer according to aspects of the present disclosure.

For example, FIG. 9 illustrates an antenna demultiplexer 600 embodying at least one aspect of the present disclosure. As shown, the demulitplexer 600 includes an input 604 capable of simultaneously receiving (e.g., from the multiplexer 400 (FIG. 7), from the multiplexer 500 (FIG. 8), etc.) a radio signal from an AM/FM antenna, a communication signal from a world cell antenna operable to receive AMPS/GSM850, GSM900, GSM1800, PCS/GSM1900, and UMTS/AWS communication signals, and a satellite signal (e.g., GPS signal and/or SDARS signal, etc.) from a satellite antenna (e.g., GPS antenna, SDARS antenna, combined GPS/SDARS antenna, etc.). In this example embodiment, the demultiplexer's input 604 is illustrated as receiving a combined AM/FM/SDARS/GPS/world cell signal. The demultiplexer 600 may further include a first output 612A for outputting the radio signal, a second output 612B for outputting the communication signal, and a third output 612C for outputting the satellite signal. In various embodiments, the demultiplexer 600 may include a fourth output for outputting whichever satellite signal (the SDARS signal or GPS signal) is not already being output by the third output 612C.

Figure 10:
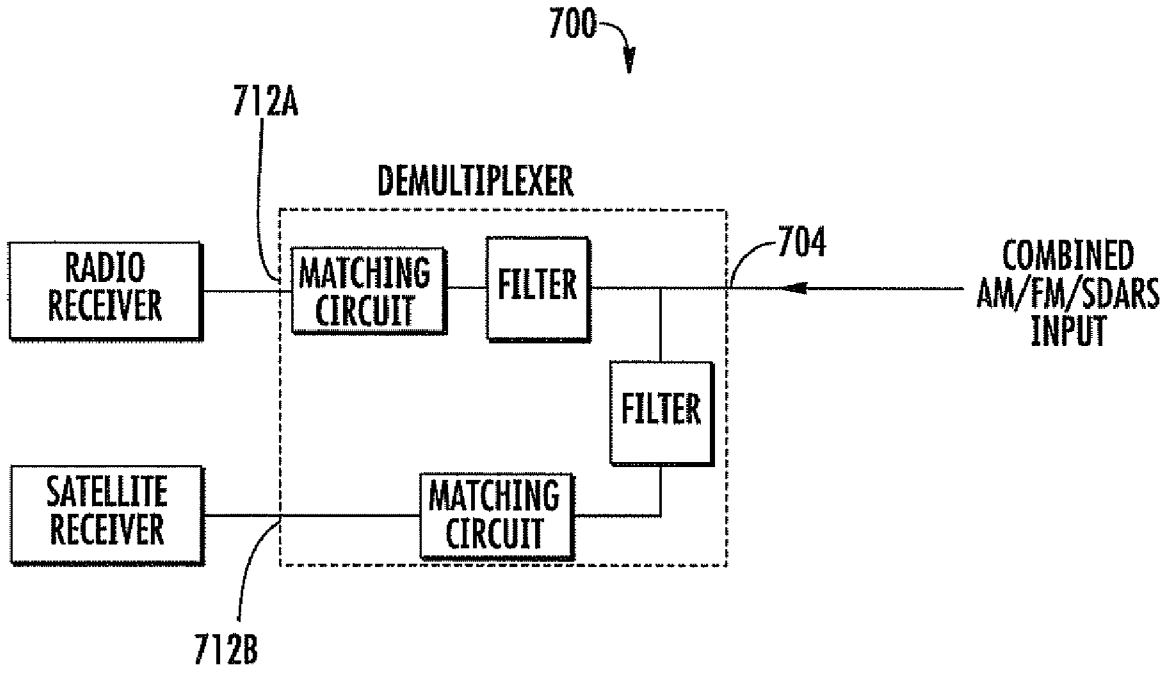
FIG. 10 is a block diagram of an exemplary embodiment of a demultiplexer for demultiplexing combined AM/FM/satellite signals output by a multiplexer according to aspects of the present disclosure.

As still another example, FIG. 10 illustrates another antenna demultiplexer 700, which includes an input 704 capable of simultaneously receiving (e.g., from the multiplexer 300 (FIG. 6), etc.) a radio signal from an AM/FM antenna and a satellite digital audio radio service (SDARS) signal from a SDARS antenna. In this example embodiment, the demultiplexer's input 604 is illustrated as receiving a combined AM/FM/SDARS signal. The demultiplexer 700 may include a first output 712A for outputting the radio signal and a second output 712B for outputting the SDARS signal.

Figure 11:
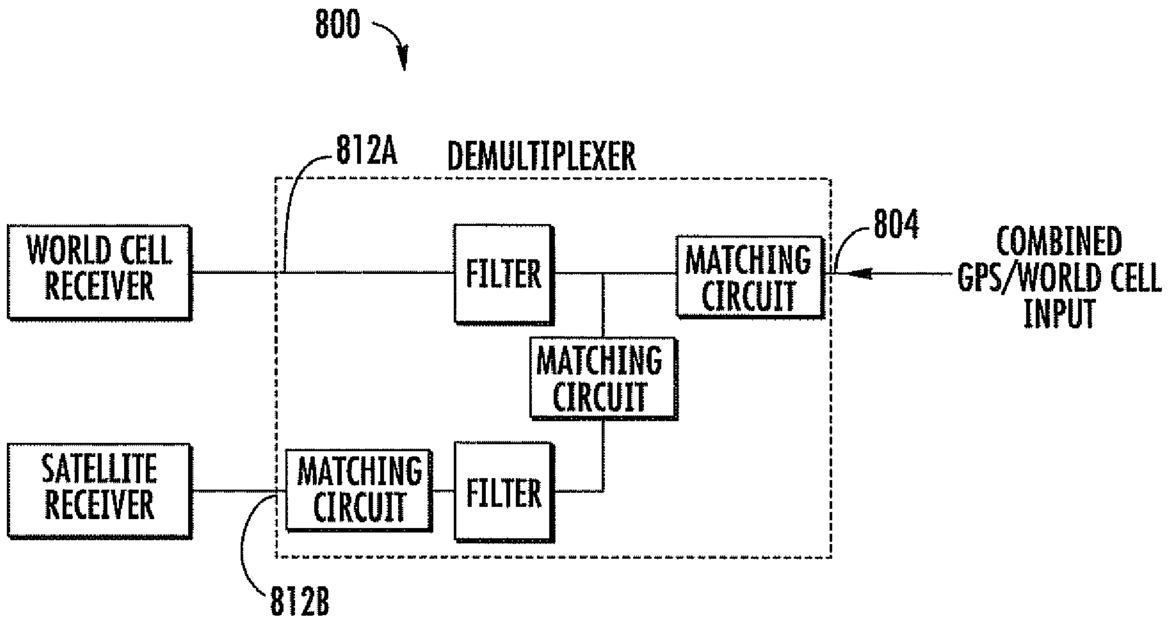
FIG. 11 is a block diagram of an exemplary embodiment of a demultiplexer for demultiplexing combined world cell/satellite signals output by a multiplexer according to aspects of the present disclosure.

FIG. 11 illustrates another example embodiment of an antenna demultiplexer 800. The demultiplexer 800 includes an input 804 capable of simultaneously receiving (e.g., from the multiplexer 100 (FIG. 1), from the multiplexer 200 (FIG. 5), etc.) a communication signal from a world cell antenna operable to receive AMPS/GSM850, GSM900, GSM1800, PCS/GSM1900, and UMTS/AWS communication signals, and a satellite signal (e.g., GPS signal and/or SDARS signal, etc.) from a satellite antenna (e.g., GPS antenna, SDARS antenna, combined GPS/SDARS antenna, etc.). In this example embodiment, the demultiplexer's input 804 is illustrated as receiving a combined GPS/world cell signal. The demultiplexer 800 may include a first output 812A for outputting the communication signal and a second output 812B for outputting the satellite signal.

Although the example embodiments in the foregoing detailed description may refer to GPS, other satellite based positioning systems may be included as an alternative to (or in addition to) GPS antennas and signals. For example, the multiplexers, demultiplexers, antennas, systems, etc. may be operable for other global navigation satellite systems such as the European Galileo system, the Russian GLONASS, the Chinese Beidou navigation system, the Indian IRNSS, etc.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Terms such as "first," "second," and other numerical terms when used herein do not imply a sequence or order unless clearly indicated by the context.

The foregoing description of the embodiments of the present invention has been provided for purposes of illustration and description. It is not intended to be exhaustive or to limit the invention to the precise forms disclosed. Individual elements or features of a particular embodiment are generally not limited to that particular embodiment, but, where applicable, are interchangeable and can be used in a selected embodiment, even if not specifically shown or described.

What is claimed is:

1. An antenna multiplexer comprising:

a first input configured to receive a communication signal from and transmit a communication signal to a world cell antenna operable for use with AMPS/GSM850, GSM900, GSM1800, PCS/GSM1900, and UMTS/AWS communication signals;

a second input configured to receive a satellite signal from a satellite antenna;

a first notch filter coupled to the first input and configured to limit the satellite signal from passing to the world cell antenna;

a second notch filter coupled to the second input and configured to limit the received and transmitted communication signals from passing to the satellite antenna;

an output configured to output a combined signal including the communication signals and the satellite signal;

a first matching circuit configured to adjust an output impedance of the multiplexer;

a second matching circuit coupled between the second input and the second notch filter and configured to match an impedance of the satellite antenna to a filter impedance of the second notch filter; and a third matching circuit coupled between the first notch filter and the second notch filter and configured to match a second notch filter output to a first filter output;

wherein the antenna multiplexer is operable via DC phantom power provided to the antenna multiplexer through the output.

2. The antenna multiplexer of claim 1, wherein the multiplexer does not separate AMPS/GSM850, GSM900, GSM1800, PCS/GSM1900, and UMTS/AWS communication signals.

3. The antenna multiplexer of claim 1, wherein:

the satellite antenna is a global positioning satellite (GPS) antenna; and the satellite signal is a GPS signal.

4. The antenna multiplexer of claim 1, wherein:

the satellite antenna is a combined satellite digital audio radio service (SDARS) and GPS antenna; and the satellite signal includes a GPS signal and an SDARS signal.

5. The antenna multiplexer of claim 1, wherein:

the satellite antenna is a combined satellite digital audio radio service (SDARS) and GPS antenna;

the satellite signal includes a GPS signal and an SDARS signal;

the antenna multiplexer further includes a third filter coupled between the second input and the third matching circuit to permit the SDARS signal to pass through the third filter and limit passage of other signals; and the second notch filter is configured to permit the GPS signal to pass through the second filter and limit passage of other signals.

6. An antenna system comprising:

the antenna multiplexer of claim 1.

7. A system comprising:

the antenna multiplexer of claim 1; and a single communication line routed from the multiplexer output for carrying the combined signal including the received and transmitted communication signal and the satellite signal that was outputted by the multiplexer output.

8. The system of claim 7, wherein the single communication line is a single coaxial cable.

9. The antenna multiplexer of claim 1, further comprising:

a third input for receiving a radio signal from an AM/FM antenna.

10. The antenna multiplexer of claim 9, wherein:

the second input is operable for receiving a satellite signal comprising a GPS signal and an SDARS signal from a combined SDARS/GPS antenna; and the output is operable for outputting a combined signal including the radio signal, the received and transmitted communication signal, the GPS signal, and the SDARS signal.

11. The antenna multiplexer of claim 9, wherein:

the second input is operable for receiving a satellite signal comprising a GPS signal and an SDARS signal from a combined SDARS/GPS antenna;

the antenna multiplexer includes:

a third filter coupled to the third input to permit the radio signal to pass through the first filter and limit passage of other signals;

the first notch filter is operable to permit the received and transmitted communication signals to pass through the first filter and limit passage of other signals;

the second notch filter is operable to permit the SDARS signal to pass through the third filter and limit passage of other signals; and a fourth filter coupled to the second input to permit the GPS signal to pass through the fourth filter and limit passage of other signals.

12. An antenna system comprising:

the antenna multiplexer of claim 9;

an AM/FM antenna coupled to the third input to provide the radio signal;

a world cell antenna coupled to the first input to provide and transmit the communication signals; and a satellite antenna coupled to the second input to provide the satellite signal.

13. A system comprising:

the antenna multiplexer of claim 1;

a single communication line routed from the multiplexer output for carrying the signals output by the multiplexer output; and an antenna demultiplexer including an input for receiving signals carried by the single communication line routed from the multiplexer output.

14. The system of claim 13, wherein the single communication line is a single coaxial cable.

15. The antenna multiplexer of claim 9, wherein the satellite antenna is a satellite digital audio radio services (SDARS) antenna and the satellite signal is an SDARS signal, the antenna multiplexer further comprising:

a fourth input for receiving a global positioning satellite (GPS) signal from a GPS antenna; and a fourth filter coupled to the fourth input to permit the GPS signal to pass through the fourth filter and limit passage of other signals;

wherein the output is operable for outputting a combined signal including the received and/or transmitted communication signal, the SDARS signal, the radio signal, and the GPS signal.

16. The antenna multiplexer of claim 9, wherein the first and third inputs are operable for receiving the radio signal and for receiving and transmitting the communication signal, respectively, from a combined AM/FM/world cell antenna.

17. The antenna multiplexer of claim 1, wherein the satellite signal is a global positioning satellite (GPS) signal.

* * * * *